US012403697B2

(12) United States Patent
Kawagoe

(10) Patent No.: US 12,403,697 B2
(45) Date of Patent: Sep. 2, 2025

(54) LIQUID DISCHARGING APPARATUS

(71) Applicant: BROTHER KOGYO KABUSHIKI KAISHA, Nagoya (JP)

(72) Inventor: Masako Kawagoe, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 100 days.

(21) Appl. No.: 18/330,403

(22) Filed: Jun. 7, 2023

(65) Prior Publication Data

US 2024/0001675 A1 Jan. 4, 2024

(30) Foreign Application Priority Data

Jun. 30, 2022 (JP) ................................ 2022-105652

(51) Int. Cl.

*B41J 2/17* (2006.01)
*B41J 2/175* (2006.01)
*B41J 2/165* (2006.01)

(52) U.S. Cl.

CPC ........... *B41J 2/1721* (2013.01); *B41J 2/1714* (2013.01); *B41J 2/1728* (2024.05); *B41J 2/17509* (2013.01); *B41J 2/16508* (2013.01); *B41J 2/16523* (2013.01); *B41J 2/1742* (2024.05)

(58) Field of Classification Search

CPC ...... B41J 2/1721; B41J 2/1714; B41J 2/1728; B41J 2/17509; B41J 2/1742; B41J 2/16508; B41J 2/16523

See application file for complete search history.

(56) References Cited

U.S. PATENT DOCUMENTS

2006/0232645 A1* 10/2006 Kumagai .................. B41J 3/36 347/85

FOREIGN PATENT DOCUMENTS

JP 2002361897 A * 12/2002 ................ B41J 3/36
JP 2015-63007 A 4/2015

* cited by examiner

*Primary Examiner* — Geoffrey S Mruk
(74) *Attorney, Agent, or Firm* — Merchant & Gould P.C.

(57) ABSTRACT

A liquid discharging apparatus, having a main housing, a liquid discharging head with nozzles, a container to store a printable medium, a waste liquid storage located at a position to at least partly overlap the container and lower than the container in a vertical direction, a mountable compartment, in which the waste liquid storage is demountably mountable, is provided. The mountable compartment is formed on a sideward face of the main housing on one side in a widthwise direction being a scanning direction of the liquid discharging head. The mountable compartment is open at a position frontward with respect to a connector, which connects a power cord for receiving external power supply to the main housing there-through, in a front-rear direction being a conveying direction to convey the printable medium and toward which the printable medium is ejected from the main housing.

15 Claims, 11 Drawing Sheets

LIQUID DISCHARGING APPARATUS

REFERENCE TO RELATED APPLICATIONS

This application claims priority from Japanese Patent Application No. 2022-105652 filed on Jun. 30, 2022. The entire content of the priority application is incorporated herein by reference.

BACKGROUND ART

A liquid discharging apparatus that may discharge liquid from a liquid discharging head to print an image on a sheet is known. The liquid discharging apparatus may have a waste liquid container to collect waste liquid discharged from the liquid discharging head. The waste liquid container may be located below a feeder cassette and may be drawn outward for being exchanged in a same direction as the feeder cassette to be drawn outward from a body of the liquid discharging apparatus.

DESCRIPTION

In the liquid discharging apparatus, the direction to draw the feeder cassette outward may be the same as a direction, in which the sheet is ejected outward from the body of the liquid discharging apparatus. In other words, the direction to draw the waste liquid container outward may be the same as the direction, in which the sheet is ejected outward from the body of the liquid discharging apparatus. Therefore, when the sheets are left in stack on an ejection tray, the waste liquid container drawn outward may interfere with the stacked sheets and may cause troubles in a user's works to exchange the waste liquid container with a new waste liquid container.

The present disclosure is advantageous in that a liquid discharging apparatus, in which waste liquid containers may be exchanged easily while sheets stay in an ejection tray, is provided.

FIRST EMBODIMENT

A first embodiment of the present disclosure will be described below.

[Inkjet Printer 1]

<Overall Configuration>

Figure 1:
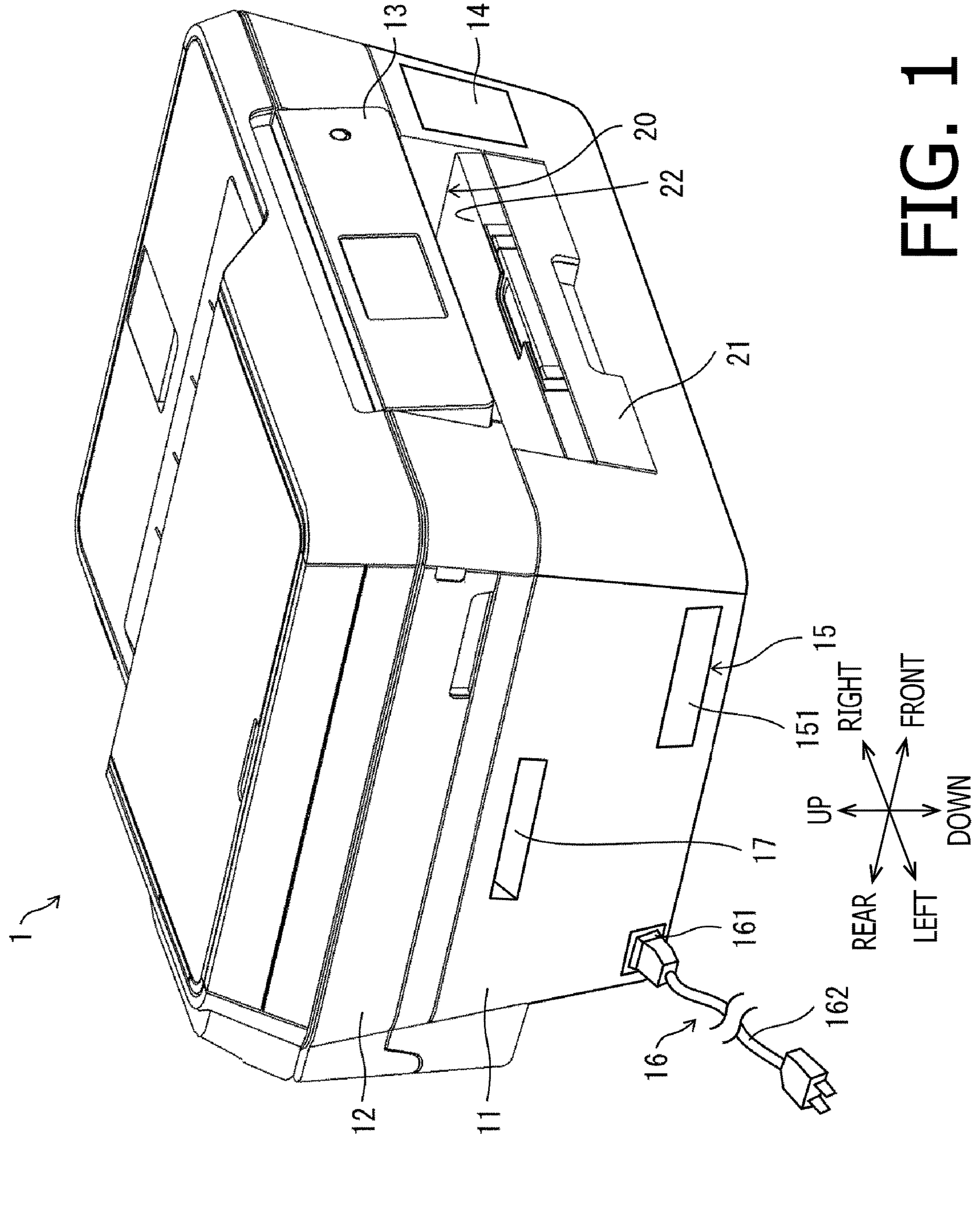
FIG. 1 is a perspective exterior view of an inkjet printer.
Figure 2:
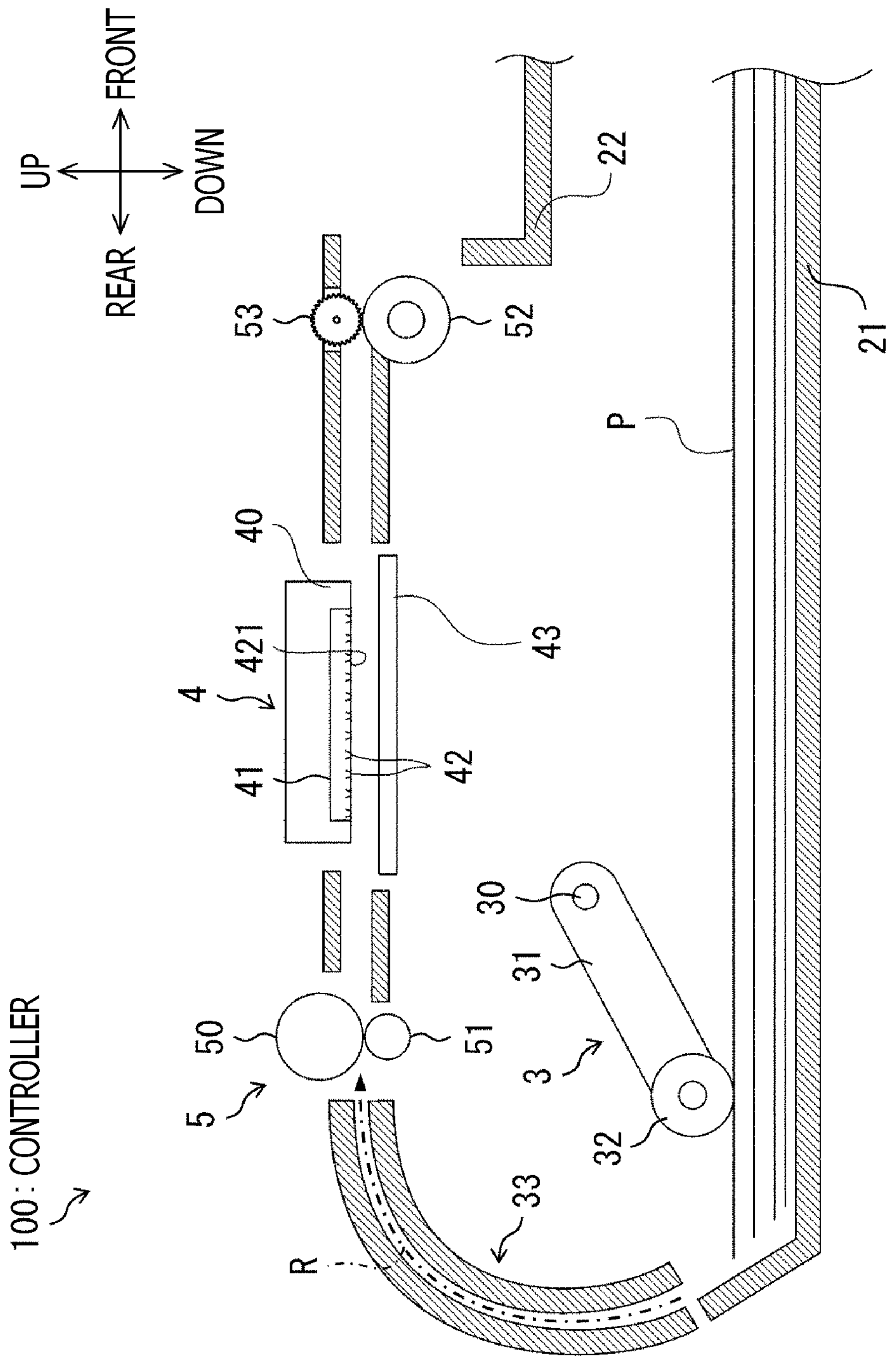
FIG. 2 is a cross-sectional view of an inner structure of the inkjet printer.
Figure 3:
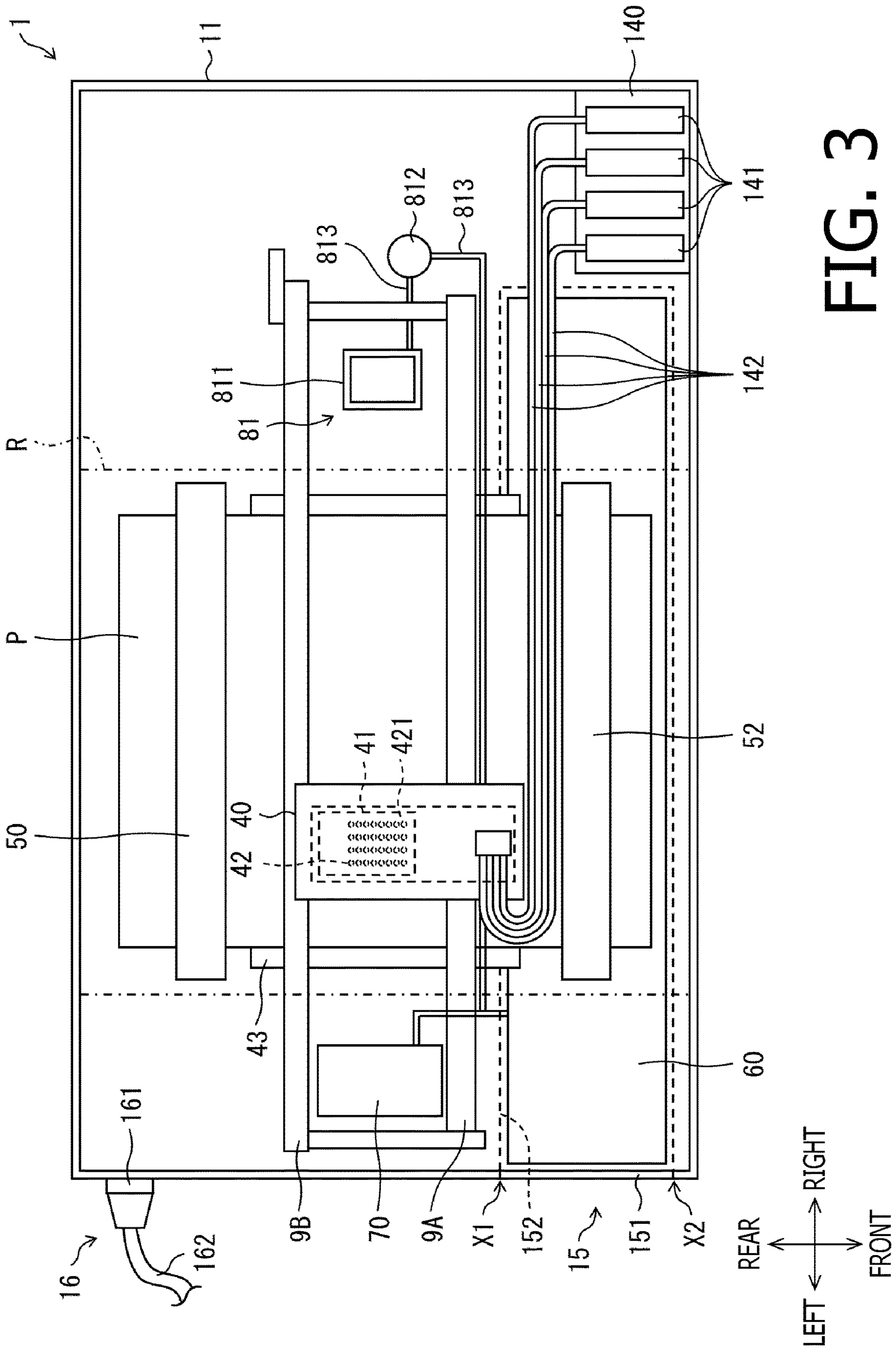
FIG. 3 is a cross-sectional view of the inkjet printer viewed from an upper side.

An overall configuration of an inkjet printer 1 will be described below with reference to FIGS. 1-3. FIG. 1 is a perspective exterior view of the inkjet printer 1. FIG. 2 is a cross-sectional view of an inner structure of the inkjet printer 1. FIG. 3 is a cross-sectional view of the inkjet printer 1 viewed from an upper side.

The inkjet printer 1 shown in FIG. 1 may discharge liquid. In the following description, directions in the inkjet printer 1 are defined with reference to an orientation of the inkjet printer 1 in a usable condition set on a base plane as shown in FIG. 1: a vertical direction as indicated by upward and downward arrows in FIG. 1 includes up-to-down and down-to-up directions, whereas a side toward the base plane is defined as a lower side. A front-rear direction as indicated by arrows pointing lower-rightward and upper-rearward in FIG. 1 includes front-to-rear and rear-to-front directions, whereas a side on which an opening 20 is located is defined as a front side. A left-right direction, or a widthwise direction, as indicated by arrows pointing lower-leftward and upper-rightward in FIG. 1 includes leftward and rightward directions, whereas a lefthand side to a user who faces a face on the front side of the inkjet printer 1 is defined as a leftward side.

In the following paragraphs, the vertical direction may be called a direction intersecting orthogonally with a nozzle surface 421 of a recording head 41 (see FIG. 3). The front-rear direction may be called a conveying direction to convey a sheet P by a conveyer 5 (see FIG. 2). The widthwise direction may also be called a scanning direction, in which a carriage 40 (see FIG. 2) is movable. The recording head 41, the conveyer 5, and the carriage 40 will be described further below.

As shown in FIG. 1, the inkjet printer 1 includes a main housing 11 and a scanner housing 12 stacked on an upper side in the inkjet printer 1. The main housing 11 and the scanner housing 12 together form a substantially rectangular-box shape.

On a front side of the main housing 11, an operation panel 13 and a cartridge cover 14 are arranged. The operation panel 13 includes operation devices, such as operation buttons, and a liquid crystal display. The cartridge cover 14 is pivotable with respect to the main housing 11. Inside the cartridge cover 14, as shown in FIG. 3, ink cartridges 141 are arranged and attached to a cartridge case 140. Moreover, as shown in FIG. 1, on the front side of the main housing 11, the opening 20 is formed. Through the opening 20 formed on the front side of the main housing 11, a feeder tray 21 for containing a printable medium and an ejection tray 22 may be attached to or detached from the inkjet printer 1. The scanner housing 12 accommodates a scanner (not shown), which may read an image appearing on a sheet P.

A waste liquid box exchangeable unit 15, a power unit 16, and a gripper 17 are located on a sideward face on a widthwise end of the main housing 11. For example, the waste liquid box exchangeable unit 15, the power unit 16, and the gripper 17 may be located on a leftward face of the main housing 11.

The waste liquid box exchangeable unit 15 includes a cover 151, which may be pivotable with respect to the main housing 11, and a mountable compartment 152 (see FIG. 3), which is exposed when the cover 151 is open and may accommodate a waste liquid box 60. In other words, the cover 151 being open allows the waste liquid box 60 to be mounted in and demounted from the main housing 11. In the following paragraphs, directions, in which the waste liquid box 60 is mountable in and demountable from the main housing 11 may be called a mountable/demountable direction.

The mountable compartment 152 is located at a position such that the waste liquid box 60 is mounted at a position at least partly lower than the feeder tray 21 and the ejection tray 22 and overlap the feeder tray 21 and the ejection tray. In other words, the mountable compartment 152 is at least partly located in the vertical direction to be lower than the feeder tray 21 and the ejection tray 22. The mountable compartment 152 has a form to fit with the waste liquid box 60 and has a wall, on which a sideward face of the waste liquid box 60 may abut, on an inner side in the mounting/demounting direction. The wall may therefore restrict the waste liquid box 60 from moving further inward. Optionally, the mountable compartment 152 may have a guide rail, on which a bottom face or a side face of the waste liquid box 60 may abut, and the guide rail may restrict the waste liquid box 60 from moving further inward.

The waste liquid box exchangeable unit 15 may not necessarily have the cover 151 being openable/closable. For example, a waste liquid box unit, which consists of the waste liquid box 60 and a box retainer having the cover 151 to retain the waste liquid box 60, may be mounted in and demounted from the main housing 11. In this arrangement, when the waste liquid box unit is demounted from the main housing 11, an opening having a form that corresponds to a form of the waste liquid box unit may be exposed; and when the waste liquid box unit is mounted in the main housing 11, the cover 151 attached to the waste liquid box unit may close the opening.

The power unit 16 includes a connector 161 on the main housing 11 and a power cord 162. The power cord 162 is connected to the connector 161 at one end and, when connected to the connector 161 at the one end, extends outward from the main housing 11. The power cord 162 has a plug, which may be plugged into an external power outlet, on an end opposite to the one end to be connected to the connector 161. The power unit 16 may be supplied with power to the inkjet printer 1 from the external outlet. The connector 161 may be located at a rearward position on the sideward face of the main housing 11. Optionally, the connector 161 may be located at a corner of the sideward face and a rearward face of the main housing 11 or may be located on the rearward face of the main housing 11.

Optionally, moreover, the power cord 162 may be detachably connected to the connector 161 or may be connected fixedly to the connector 161. In the arrangement where the power cord 162 is detachable from the connector 161, the connector 161 may serve as an inlet, and the end of the power cord 162 opposite to the outlet plug may have an inlet plug.

The gripper 171 may consist of a recess formed on the sideward face of the main housing 11. The gripper 171 allows a user to grab there-onto in order to lift or move the inkjet printer 1. Optionally, the gripper 17 may be formed to protrude from the sideward face of the main housing 11. The gripper 17 may be located at a position to coincide with a gravity center of the inkjet printer 1 in the front-rear direction and in the vertical direction. In other words, the gripper 17 may be located at a substantially central position in the front-rear direction and the vertical direction on the sideward surface of the main housing 11.

The opening of the mountable compartment 152, which may be exposed when the cover 151 located on the sideward face of the main housing 11 on the widthwise end is open, is located frontward with respect to the connector 161, through which the power cord 162 is connected to the main housing 11. In the present embodiment, a frontward side is a side, on which the opening 20 is formed, and a side, toward which the sheet P is ejected. The sheet P may be, as will be described further below, conveyed from the feeder tray 21 to the ejection tray 22 and ejected outward from the ejection tray 22. The opening of the mountable compartment 152 is located frontward with respect to the gripper 17.

The opening of the mountable compartment 152 is located between a first position X1, which is apart by a predetermined distance from an edge where the rearward face of the main housing 11 and the sideward face of the main housing 11 meet, and a second position X2, which is apart by a predetermined distance from an edge where the frontward face of the main housing 11 and the sideward face of the main housing 11 meet. Therefore, the opening of the mountable compartment 152 is located apart from corners of the main housing 11 by predetermined distances. In other words, the opening of the mountable compartment 152 is located at a position excluding the corners. A distance between the first position X1 and the second position X2, which is a dimension of the opening of the mountable compartment 152 in the front-rear direction, is greater than a dimension of the waste liquid box 60 in the front-rear direction.

<Internal Configuration>

Next, an internal configuration of the inkjet printer 1 will be described with reference to FIG. 2.

As shown in FIG. 2, the inkjet printer 1 includes a feeder 3, a recorder 4, a conveyer and a controller 100.

The feeder 3 includes a shaft 30, a feeder arm 31, and a feeder roller 32. The feeder 3 may feed sheets P contained in the feeder tray 21 to a conveyer path R by forwarding rotation of the feeder roller 32. The feeder roller 32 is located at a tip end of the feeder arm 31 and is supported rotatably by the feeder arm 31. The feeder arm 31 is pivotably supported by the shaft which is supported by a frame of the inkjet printer 1. The feeder arm 31 is urged toward the feeder tray 21 by weight thereof or by an urging force from, for example, a spring.

The conveyer path R extends upward from a rear end of the feeder tray 21, curving frontward in an area delimited by a guide member 33, to the ejection tray 22.

The feeder roller 32 may, when a feeder motor (not shown) is activated by the controller 100, pick up the sheets P from the feeder tray 21 one by one. The sheets P picked up from the feeder tray 21 may be conveyed along the conveyer path R and fed to the recorder 4.

The recorder 4 is located above the feeder 3. The recorder 4 includes the carriage 40, a recording head 41 for discharging liquid, a plurality of nozzles 42, and a platen 43. The carriage 40 is supported by guide rail 9A and a guide rail 9B, which extend in the widthwise direction (see FIG. 3). The carriage 40 may, when a driving force from a carriage motor (not shown) is transmitted thereto, move back and forth in the scanning direction which is the widthwise direction, i.e., a direction of width of the sheet P being conveyed. For recording an image on the sheet P, the controller 100 of the inkjet printer 1 may repeat a recording process, in which the controller 100 operates the carriage 40 to move in the widthwise direction and the recording head 41 to discharge ink through the nozzles 42 while the sheet P stays still, and a conveying process, in which the controller 100 drives the conveyer roller 50 and the ejection roller 52 to convey the sheet P by a predetermined linefeed amount, alternately.

On the carriage 40, the recording head 41 is mounted. The plurality of nozzles 42 are formed on a lower face of the recording head 41. The plurality of nozzles 42 are arrayed in lines along the front-rear direction to form nozzle lines, and four (4) nozzle lines are formed on a nozzle surface 421 to align in the widthwise direction. The nozzles 42 forming a first one of the nozzle lines, a second one of the nozzle lines, a third one of the nozzle lines, and a fourth one of the nozzle lines from right to left, may discharge inks in colors of black, yellow, cyan, and magenta, respectively. However, the aligning order of the nozzle lines may not necessarily be limited but may be changed optionally, for example, on a product model basis.

The recording head 41 may discharge liquid, i.e., the inks, through the nozzles 42 by causing vibrating elements such as piezo elements to vibrate.

The platen 43 is located at a position below the recording head 41 and extends throughout or over the entire length of the sheet P in the widthwise direction. The platen 43 may support the sheet P from below during the recording process. While the carriage 40 moves in the widthwise direction over the sheet P supported by the platen 43, the recording head 41 may discharge the ink droplets selectively from the nozzles 42 to record the image on the sheet P.

The conveyer 5 includes the conveyer roller 50 and the ejection roller 52, which are located on one side and the other side, respectively, of the carriage 40 and the platen 43 in the front-rear direction. At a position below the conveyer roller 50, a pinch roller 51 is arranged to face the conveyer roller 50. The conveyer roller 50 may be driven by a conveyer motor (not shown) to rotate. The pinch roller 51 may rotate along with the rotation of the conveyer roller 50. With the rotation of the conveyer roller 50 and the pinch roller 51, the sheet P nipped between the conveyer roller 50 and the pinch roller 51 may be conveyed along the conveyer path R to the recorder 4.

The ejection roller 52 is located on a downstream side of the conveyer roller 50 across the carriage 40 and the platen 43 in the conveying direction. At a position above the ejection roller 52, a spur roller 53 is arranged to face the ejection roller 52. The ejection roller 52 may be driven by the conveyer motor (not shown) to rotate. The spur roller 53 may rotate along with the rotation of the ejection roller 52. With the rotation of the ejection roller 52 and the spur roller 53, the sheet P nipped between the ejection roller 52 and the spur roller 53 may be ejected from the conveyer path R to rest at the ejection tray 22.

The controller 100 includes a Central Processing Unit (CPU), a Read-Only Memory (ROM), a Random Access Memory (RAM), and Application Specific Integrated Circuit (ASIC) including a variety of controlling circuits. The controller 100 is connected with devices that compose the inkjet printer 1, including the recording head 41 and the conveyer motor of the conveyer 5. The controller 100 is, moreover, connected with the operation panel 13 and external devices such as a PC (not shown).

The controller 100 may run programs stored in the ROM to cause the CPU and the ASIC to execute processes to control acts of the devices, including the recording head 41 and a maintenance unit 81, such as a process called flushing to discharge ink droplets from the nozzles 42. The controller 100 may control the recording head 41 and the conveyer motor according to a printing command transmitted from the external device such as the PC and execute a printing process to print the image on the sheet P. The maintenance unit 81 and the flushing process will be described further below. It may be noted that the controller 100 may not necessarily consist of the CPU, the ROM, the RAM, and the ASIC alone but may consist of any hardware devices.

The inkjet printer 1 in the configuration as described above may operate the conveyer 5 to convey the sheet P in the conveying direction, move the carriage 40 along with the recording head 41 in the scanning direction, and operate the recording head 41 to discharge the ink to print an image on the sheet P.

<Cartridge Case 140>

Next, the cartridge case 140 will be described with reference to FIG. 3. As shown in FIG. 3, the cartridge case 140 may contain four (4) ink cartridges 141 aligning in the widthwise direction. The ink cartridges 141 are removable from the cartridge case 140 and may contain the colored inks to be supplied to the recording head 41. For example, the ink cartridges 141 may contain the inks in the colors of black, yellow, cyan, and magenta. The inks contained in the ink cartridges 141 may be supplied to the recording head 41 through tubes 142.

<Maintenance Unit 81>

Next, the maintenance unit 81 will be described with reference to FIG. 3. As shown in FIG. 3, the inkjet printer 1 has the maintenance unit 81. The maintenance unit 81 includes a cap 811, a pump 812, and a tube 813. The maintenance unit 81 is located at a position lower than a scanning path of the carriage 40 and on an outer side from the platen 43 in the scanning direction. In the present embodiment, the maintenance unit 81 is located rightward with respect to the platen 43. However, the maintenance unit 81 may optionally be located leftward with respect to the platen 43.

The cap 811 is formed of rubber. The cap 811 is located at a position lower than the recording head 41 and on the outer side from the platen 43 in the scanning direction. When the carriage 40 is located at a maintenance position, which is on the outer side from the platen 43 in the scanning direction, the cap 811 faces the nozzle surface 421 of the recording head 41.

The cap 811 is movable in the vertical direction by, for example, a lifting device (not shown). The cap 811 located at the maintenance position may move upward to fit with the nozzle surface 421. The cap 811 may collect the ink discharged from the recording head 41. The cap 811 fitting with the nozzle surface 421 may cover the recording head 41 to receive the inks discharged from the recording head 41 and prevent the nozzle surface 421 from drying.

The pump 812 may be driven by a motor (not shown) to suction the inks in the nozzles 42 through the cap 811 and the tube 813 and eject the suctioned inks through the tube 813 at the waste liquid box 60.

The tube 813 forms a flow path, in which the inks ejected from the maintenance unit 81 may be transported to the waste liquid box 60. The tube 813 is made of a flexible material. The inks may be transported from the cap 811 through the pump 812 to the waste liquid box 60.

The maintenance unit 81 in the configuration as described above may perform maintenance works on the recording head 41. In particular, the maintenance unit 81 may perform a purging action to suction the inks and the air in the nozzles 42 and dust adhered to the nozzles 42 as a maintenance work. In the following paragraphs, the term "inks" may include the inks and the air in the nozzles 42 and the dust adhered to the nozzles 42. The inks removed from the recording head 41 by the maintenance unit 81 may be stored in the waste liquid box 60.

<Flushing Unit 70>

The flushing unit 70 may prevent the inks that are discharged from the nozzles 42 from scattering in mist and guide the inks to the waste liquid box 60 during a flushing process. At a position below the flushing unit 70, optionally, an intermediate box (not shown) may be provided. The intermediate box may have an opening formed on an upper side at a position to coincide with the nozzles 42, and the inks discharged in the flushing process may be guided through the intermediate box to the waste liquid box 60. Optionally, the flushing unit 70 may be configured to guide the inks discharged in the flushing process directly to the waste liquid box 60.

The flushing process is an action to operate the recording head 41 while the carriage 40 is located at a flushing position, where the carriage 40 faces the flushing unit 70, to discharge the inks through the nozzles 42 at the flushing unit 70, rather than at the sheet P.

In the present embodiment, the maintenance unit 81 and the flushing unit 70 are located on outer sides of the platen 43 in the scanning direction. In particular, the flushing unit 70 is located on the opposite side to the maintenance unit 81 across the conveyer path R in the widthwise direction. For example, the maintenance unit 81 may be located on the rightward side of the conveyer path R, and the flushing unit 70 may be located on the leftward side of the conveyer path R. However, the arrangement of the maintenance unit 81 and the flushing unit 70 may not necessarily be limited to the arrangement as described above or shown in FIG. 3.

<Waste Liquid Box 60>

The waste liquid box 60 is a storage for storing the inks discharged from the recording head 41. In particular, the waste liquid box 60 may store the inks discharged from the recording head 41 during the maintenance work and the flushing process. The waste liquid box is demountably mounted in the main housing 11.

The waste liquid box 60 is mountable in and demountable from the main housing 11 through the opening of the mountable compartment 152, which may be exposed when the cover 151 is open. According to the present embodiment, the mountable/demountable direction of the waste liquid box 60 is the widthwise direction and is different from the ejecting direction, i.e., the front-rear direction, to eject the sheet P outward through the ejection tray 22. The waste liquid box 60 is mountable in and demountable from the main housing 11 through the opening of the mountable compartment 152 located frontward with respect to the connector 161, through which the power cord 162 is connected to the main housing 11, in the front-rear direction.

Figure 4:
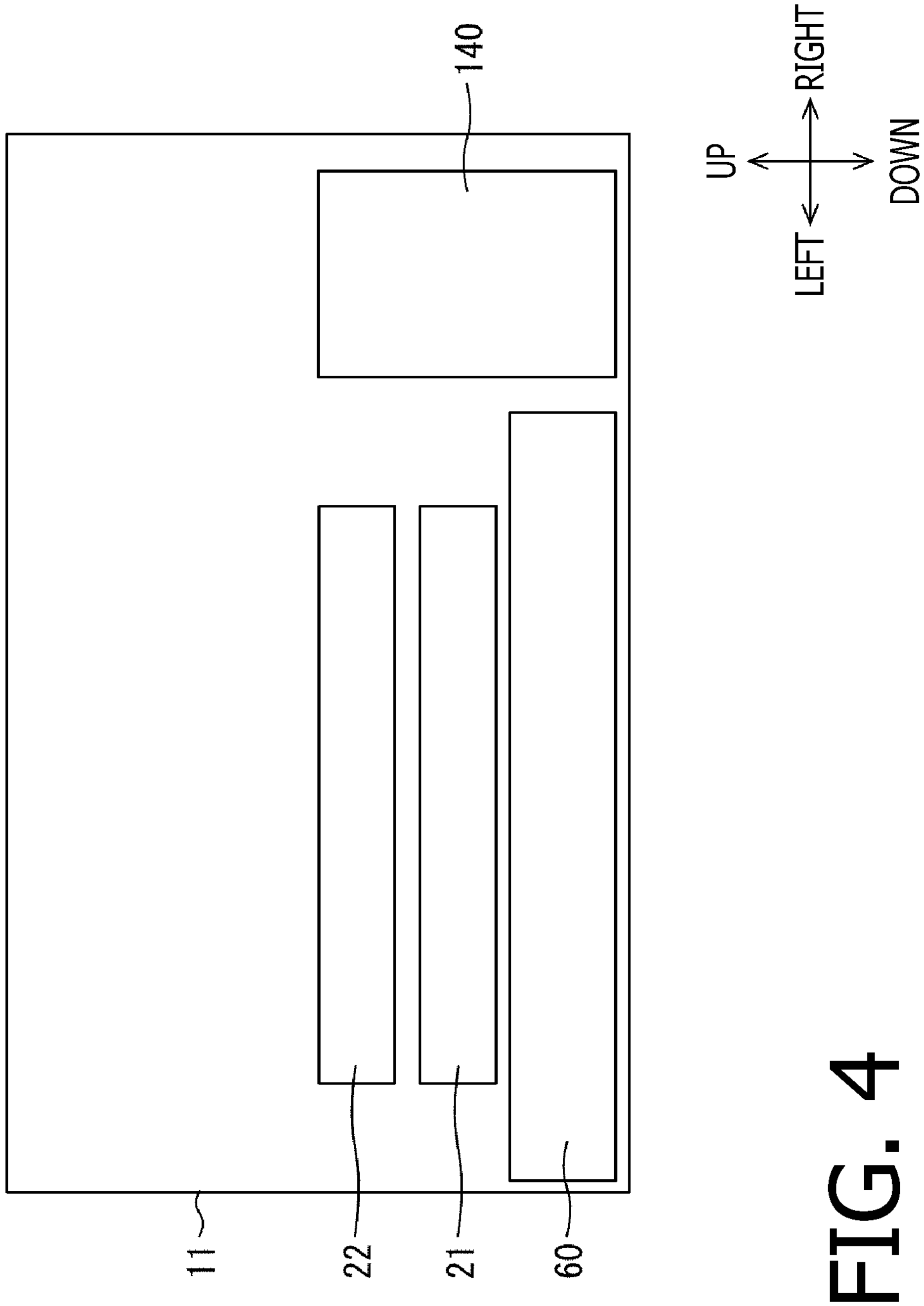
FIG. 4 illustrates an arrangement of a waste liquid box viewed from an upper side.

Arrangement of the waste liquid box 60 will be described with reference to FIGS. 3 and 4. FIG. 4 illustrates the arrangement of the waste liquid box 60 viewed from the upper side of the inkjet printer 1.

As shown in FIGS. 3 and 4, the waste liquid box 60 is located at a position, at which the waste liquid box 60 when mounted in the main housing 11 is at least partly lower than the feeder tray 21 and the ejection tray 22 and to at least partly overlap the feeder tray 21 and the ejection tray 22 in the vertical direction. In other words, as shown in FIG. 4, at least a part of the waste liquid box 60 is located to coincide with the feeder tray 21 and the ejection tray 22 in the vertical direction.

The ink cartridges 141 are arranged alongside the waste liquid box 60, the feeder tray 21, and the ejection tray 22 in the widthwise direction. For example, as shown in FIG. 3, the ink cartridges 141 may be located rightward, and the waste liquid box 60, the feeder tray 21, and the ejection tray 22 may be located leftward. Optionally, for another example, the ink cartridges 141 may be located leftward, and the waste liquid box 60, the feeder tray 21, and the ejection tray 22 may be located rightward. Meanwhile, the opening of the mountable compartment 152, in which the waste liquid box 60 is mountable, is located on the sideward face of the main housing 11 on an opposite side to the ink cartridges 141 across the conveyer path R for the sheet P. In other words, the waste liquid box 60 may be mountable in and demountable from the main housing 11 through the sideward face, which is located on the opposite side to the ink cartridges 141 across the conveyer path R for the sheet P.

In this arrangement, the waste liquid box 60 and the ink cartridges 141 may not necessarily align at a same vertical position. In other words, for example, the ink cartridges 141 may be located to be higher than the feeder tray 21 and the ejection tray 22 while the waste liquid box 60 may be located to be lower than the feeder tray 21 and the ejection tray 22. A dimension of the waste liquid box 60 in the widthwise direction is greater than dimensions of the feeder tray 21 and the ejection tray 22 in the widthwise direction. In the arrangement where the waste liquid box 60 and the ink cartridges 141 align side by side in the widthwise direction, a rightward end of the waste liquid box 60 may be located at a position to reach a leftward end of the cartridge case 140, in which the ink cartridges 141 are accommodated. In other words, the dimension of the waste liquid box 60 in the widthwise direction, i.e., a dimension of the waste liquid box 60 in a lengthwise direction, may be at most equal to a distance between the leftward end of the cartridge case 140 and the opening of the mountable compartment 152.

Benefits

According to the configuration described above, while the direction to eject the sheet P from the main housing 11 coincides with the front-rear direction, the waste liquid box 60, which is mountable through the opening of the mountable compartment 152 located at the frontward position on the sideward face of the main housing 11 on the widthwise end, may be mountable in and demountable from the main housing 11 in the direction different from the ejecting direction. Therefore, when, for example, the sheet P jams the ejection tray 22 while the inkjet printer 1 prints images on a large amount of sheets P or on a longer sheet P, the ejection tray 22 or the jammed sheet P may not interfere with the waste liquid box 60 to be demounted from or mounted in the main housing 11, and the waste liquid boxes 60 may be easily exchanged. For another example, when a longer-sized printing sheet is set to droop down on the front face of the main housing 11, the waste liquid box 60 may be demounted from or mounted in the main housing 11 without interfering with the printing sheet drooping down on the front face of the main housing 11. Therefore, a user may not be urged to remove the longer-sized printing sheet for exchanging the waste liquid boxes 60. For another example, according to the configuration described above, the waste liquid box 60 is mountable in or demountable from the main housing 11 through the frontward area on the sideward face of the main housing 11; therefore, while, for example, the inkjet printer 1 is located in an arrangement such that a rearward face of the main housing 11 faces toward a wall, the user may access the waste liquid box 60 easily for demounting and mounting. Moreover, the waste liquid box 60 is mountable in and demountable from the main housing 11 through the frontward area on the sideward face of the main housing 11 with respect to the connector 161, through which the power cord 162 is connected to the main housing 11. Therefore, the waste liquid boxes 60 may be exchanged smoothly without interfering with the power cord 163.

According to the configuration described above, moreover, the waste liquid box 60 is mountable in and demountable from the main housing 11 through the opening of the mountable compartment 152 located frontward with respect to the gripper 17. Therefore, the waste liquid boxes 60 may be exchanged easily.

Further, according to the arrangement of the waste liquid box 60 described above, the mountable compartment 152 is open at the position, which is displaced from the corners of the main housing 11. When an opening is formed in the vicinity of a corner of the main housing 11, strength of the main housing 11 tends to be lowered. In this regard, according to the present embodiment, the opening of the mountable compartment 152 is located at the position apart from the corners of the main housing 11 by predetermined distances. Therefore, the strength of the main housing 11 may be restrained from lowering.

According to the configuration described above, moreover, the liquid, which was discharged from the recording head 41 but was not used in recording the image on the sheet P, may be collected by the waste liquid collecting devices and stored in the waste liquid box 60. The waste liquid collecting devices include, for example, the cap 811 used in the maintenance work with the recording head 41. Therefore, the inks suctioned from the nozzles 42 of the recording head 41 in the maintenance work may be collected and stored in the waste liquid box 60. Moreover, the inkjet printer 1 may collect the inks discharged from the nozzles 42 in the flushing process. Thus, the inks discharged from the recording head 41 in the flushing process may be collected and stored in the waste liquid box 60.

According to the configuration described above, moreover, the waste liquid box 60 is located at the position lower than the feeder tray 21 and the ejection tray 22 to overlap the feeder tray 21 and the ejection tray 22 in the vertical direction and to align side by side with the ink cartridges 141 in the widthwise direction. Therefore, the waste liquid box 60 may be expanded at the position lower than the feeder tray 21 and the ejection tray 22 to the vicinity of the ink cartridges 141. In other words, without increasing the dimension of the main housing 11 in the widthwise direction, the waste liquid box 60 with larger capacity may be provided. With the waste liquid box 60 having the larger capacity, frequency to exchange the waste liquid boxes 60 may be lowered. Furthermore, a height of the ink cartridges 141 may be increased to a dimension of the waste liquid box 60 in the vertical direction. Therefore, the ink cartridges 141 with larger capacities may be provided.

According to the configuration described above, moreover, the opening of the mountable compartment 152 is located on the sideward face of the main housing 11 on the side opposite to the ink cartridges 141 across the conveyer path R. Therefore, the waste liquid box 60 may be mounted in and demounted from the side opposite to the ink cartridges 141. Accordingly, the waste liquid boxes 60 may be exchanged without interfering with the ink cartridges 141.

According to the configuration described above, moreover, the dimension of the waste liquid box 60 in the widthwise direction may be increased to be greater than the dimensions of the feeder tray 21 and the ejection tray 22; therefore, the waste liquid box 60 with a larger capacity may be provided. Accordingly, frequency to exchange the waste liquid boxes may be lowered.

First Modified Example

Figure 5:
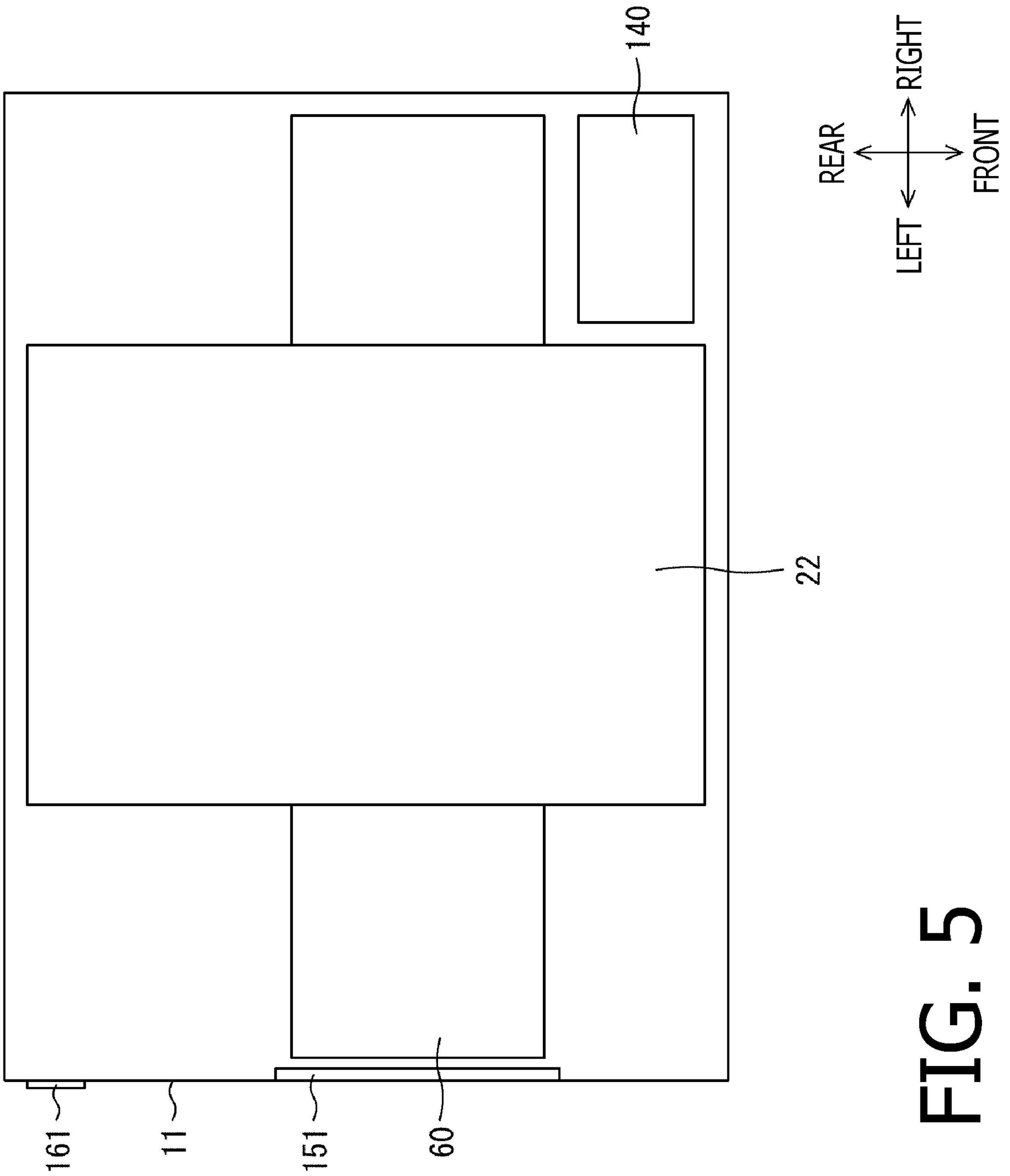
FIG. 5 illustrates another arrangement of the waste liquid box viewed from the upper side.
Figure 6:
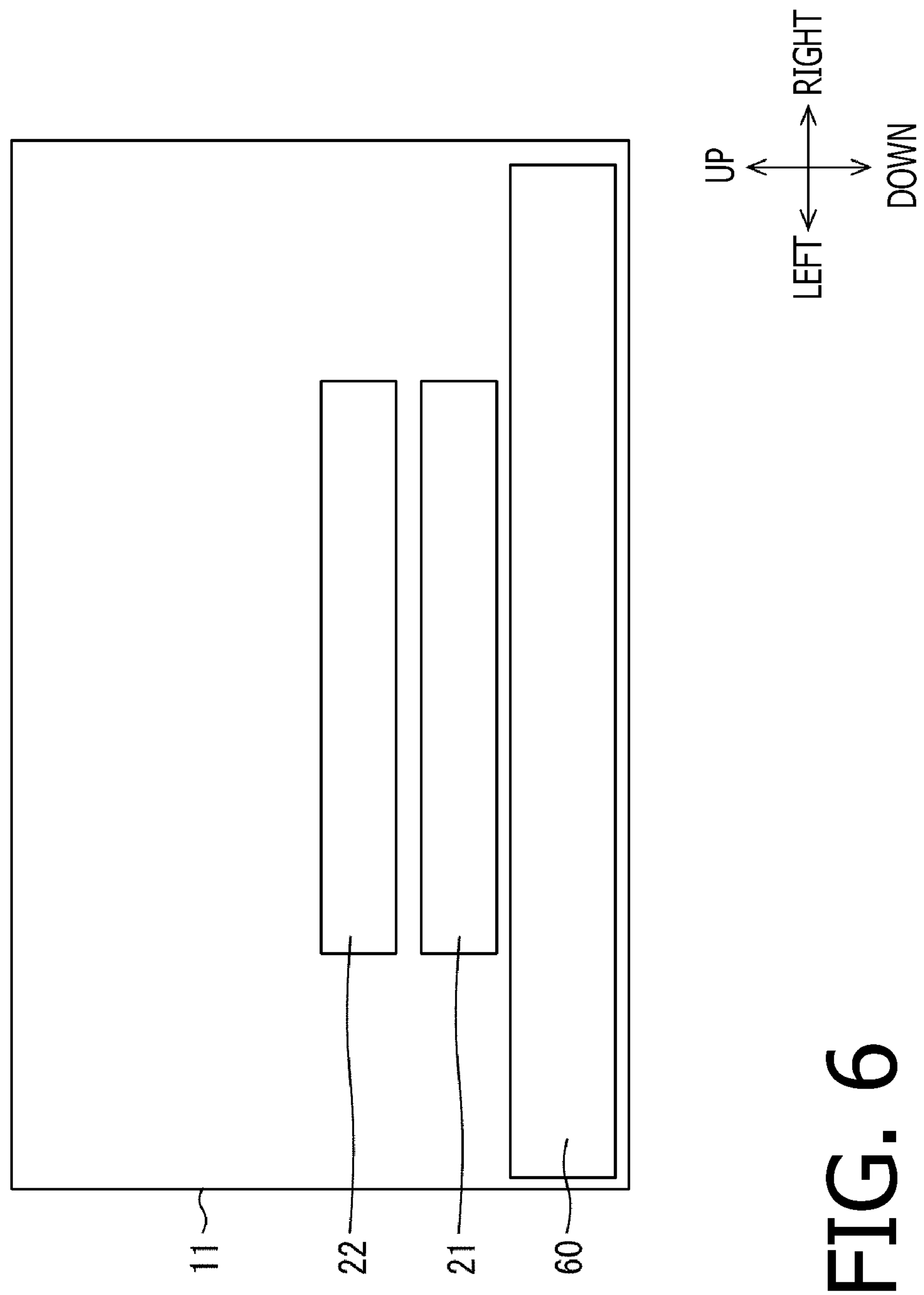
FIG. 6 illustrates the arrangement of the waste liquid box viewed from a front side.

In the first embodiment described above, the waste liquid box 60 is located to align with the ink cartridges 141 in the widthwise direction. However, the waste liquid box 60 may not necessarily be located to align with the ink cartridges 141 in the widthwise direction. A first modified arrangement of the waste liquid box 60 will be described with reference to FIGS. 5 and 6. FIG. 5 illustrates a modified arrangement of the waste liquid box 60 viewed from the upper side. FIG. 6 illustrates the modified arrangement of the waste liquid box 60 viewed from a front side.

As shown in FIG. 5, the waste liquid box 60 may be located rearward with respect to the ink cartridges 141. In other words, the waste liquid box 60 located rearward with respect to the ink cartridges 141 may not overlap the ink cartridges 141 in the widthwise direction.

According to the modified arrangement, the waste liquid box 60 being located rearward with respect to the ink cartridges 141 may be mounted in and demounted from the main housing 11 without interfering with the ink cartridges 141. Therefore, the waste liquid boxes 60 may be exchanged easily.

According to the modified arrangement, moreover, the dimension of the waste liquid box 60 in the widthwise direction may not be affected by the location of the ink cartridges 141. Therefore, the waste liquid box 60 may be, as shown in FIGS. 5 and 6, extended rightward to a position in the vicinity of the rightward end of the main housing 11. In other words, the dimension of the waste liquid box 60 in the widthwise direction may be, at most, equal to a distance between an inner surface of the sideward wall of the main housing 11 on the right and the opening of the mountable compartment 152. Therefore, without increasing the dimension of the main housing 11 in the widthwise direction, the waste liquid box 60 with a larger capacity may be provided.

Second Modified Example

Figure 7:
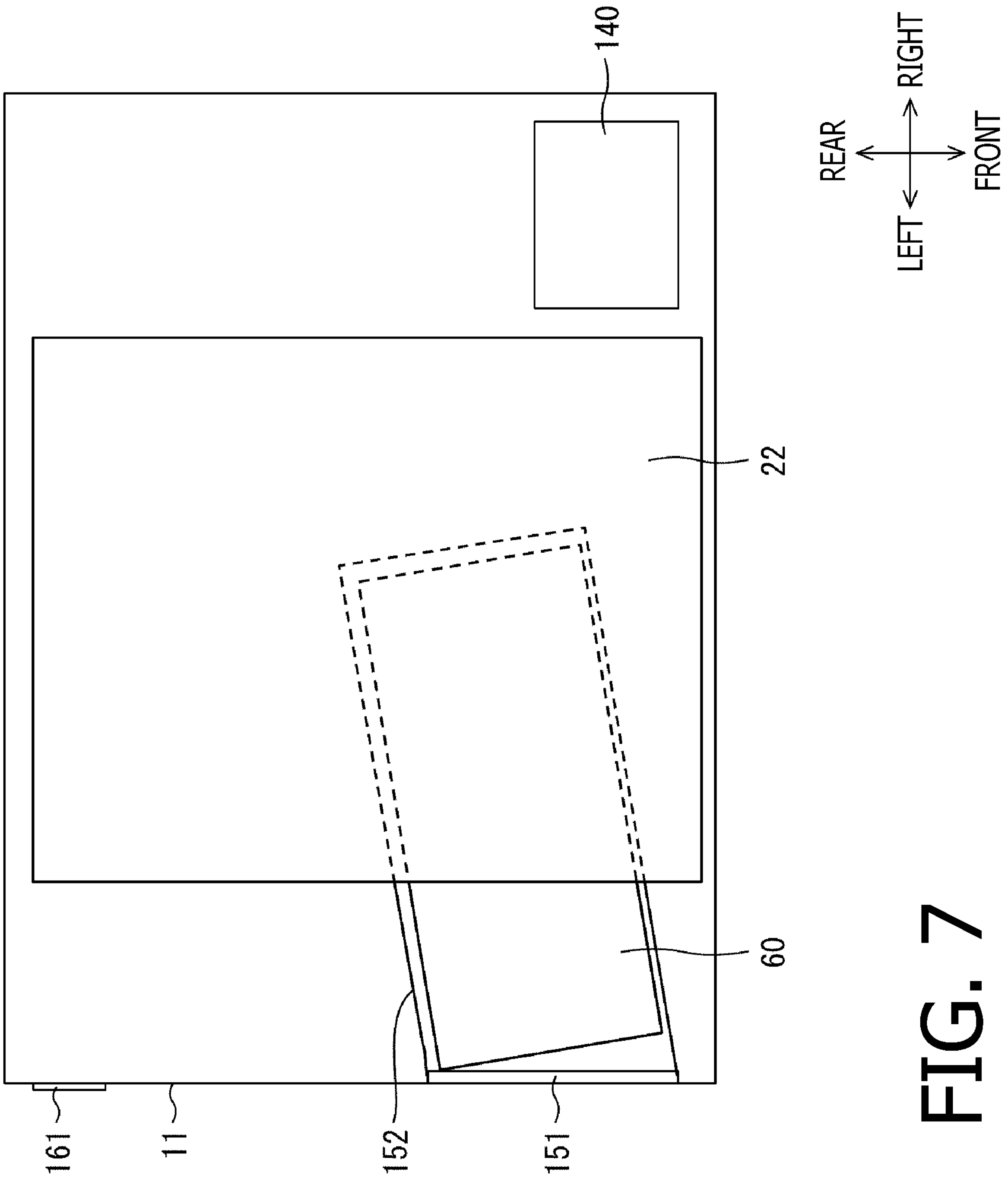
FIG. 7 illustrates another arrangement of the waste liquid box viewed from the upper side.

A second modified arrangement of the waste liquid box 60 will be described with reference to FIG. 7. FIG. 7 illustrates the second modified arrangement of the waste liquid box viewed from the upper side.

As shown in FIG. 7, the waste liquid box 60 may be mounted in the mountable compartment 152 in a posture such that an edge of the frontward face and toward the opening of the mountable compartment 152, e.g., the leftward-front edge, is located frontward with respect to an edge of the frontward face and opposite to the opening of the mountable compartment 152, e.g., the rightward-front edge, in the front-rear direction. In other words, the waste liquid box 60 may be mounted in the mountable compartment 152 in a skewed posture, in which the edge of the frontward face and toward the opening of the mountable compartment 152 is located frontward, and the edge of the frontward face and opposite to the opening of the mountable compartment 152 is located rearward. In this arrangement, the mountable compartment 152 may have walls that are skewed with respect to the front face of the main housing 11 in the top plan view inside the main housing 11. Therefore, a user may insert the waste liquid box 60 in the mountable compartment 152 to abut on one of the walls and slide along the wall inward to mount the waste liquid box 60 in the skewed posture inside the main housing 11. Moreover, optionally, the mountable compartment 152 may have a guide rail in a skewed posture with respect to the front face of the main housing 11 in the top plan view to guide the waste liquid box 60.

According to the second modified arrangement, the waste liquid box 60 may be mounted in or demounted from the main housing 11 from a frontward oblique position. Therefore, for example, when an obstacle object is located on the widthwise side of the main housing 11, while it may be difficult to mount or demount the waste liquid box 60 in or from the main housing 11 in the widthwise direction, the waste liquid box 60 may be mounted in or demounted from the main housing 11 in the skewed direction easily. Therefore, the waste liquid boxes 60 may be exchanged easily.

Third Modified Example

Figure 8:
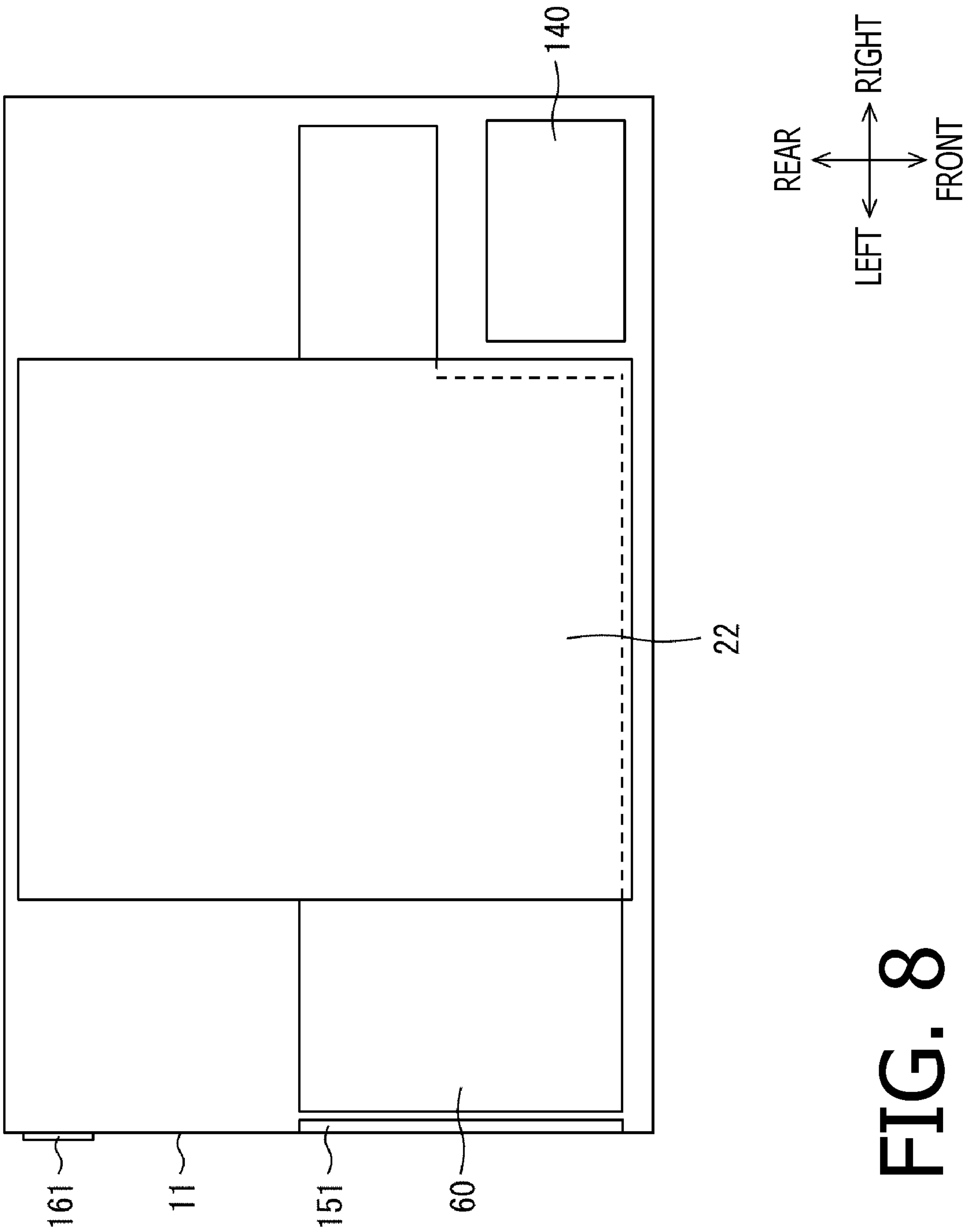
FIG. 8 illustrates another arrangement of the waste liquid box viewed from the upper side.

A third modified arrangement of the waste liquid box 60 will be described with reference to FIG. 8. FIG. 8 illustrates the third modified arrangement of the waste liquid box 60 viewed from the upper side.

As shown in FIG. 8, the waste liquid box 60 may be at least partly located rearward with respect to the position to locate the ink cartridges 141 in the main housing 11. For example, as shown in FIG. 8, the waste liquid box 60 may have a form of an L in the upper plan view, and a part of the L form may be located rearward with respect to the ink cartridges 141, and the other part of the L form may be located sideward in the widthwise direction with respect to the ink cartridges 141.

Thus, a dimension of a part of the waste liquid box 60 that overlaps the ink cartridges 141 in the widthwise direction may be reduced by a dimension of the ink cartridges 141 in the widthwise direction, while a dimension of a remainder of the waste liquid box 60 may be greater. According to the third modified arrangement of the waste liquid box 60, the ink cartridges 141 may be prevented from interfering with the waste liquid box 60 being mounted in or demounted from the main housing 11. Therefore, the waste liquid boxes 60 may be exchanged easily, and the waste liquid box 60 with a larger capacity may be provided.

Second Embodiment

A second embodiment of the present disclosure will be described below. In the following paragraphs, items that are substantially identical to those described above will be referred to by the same reference signs, and description of those items is herein omitted.

Figure 9:
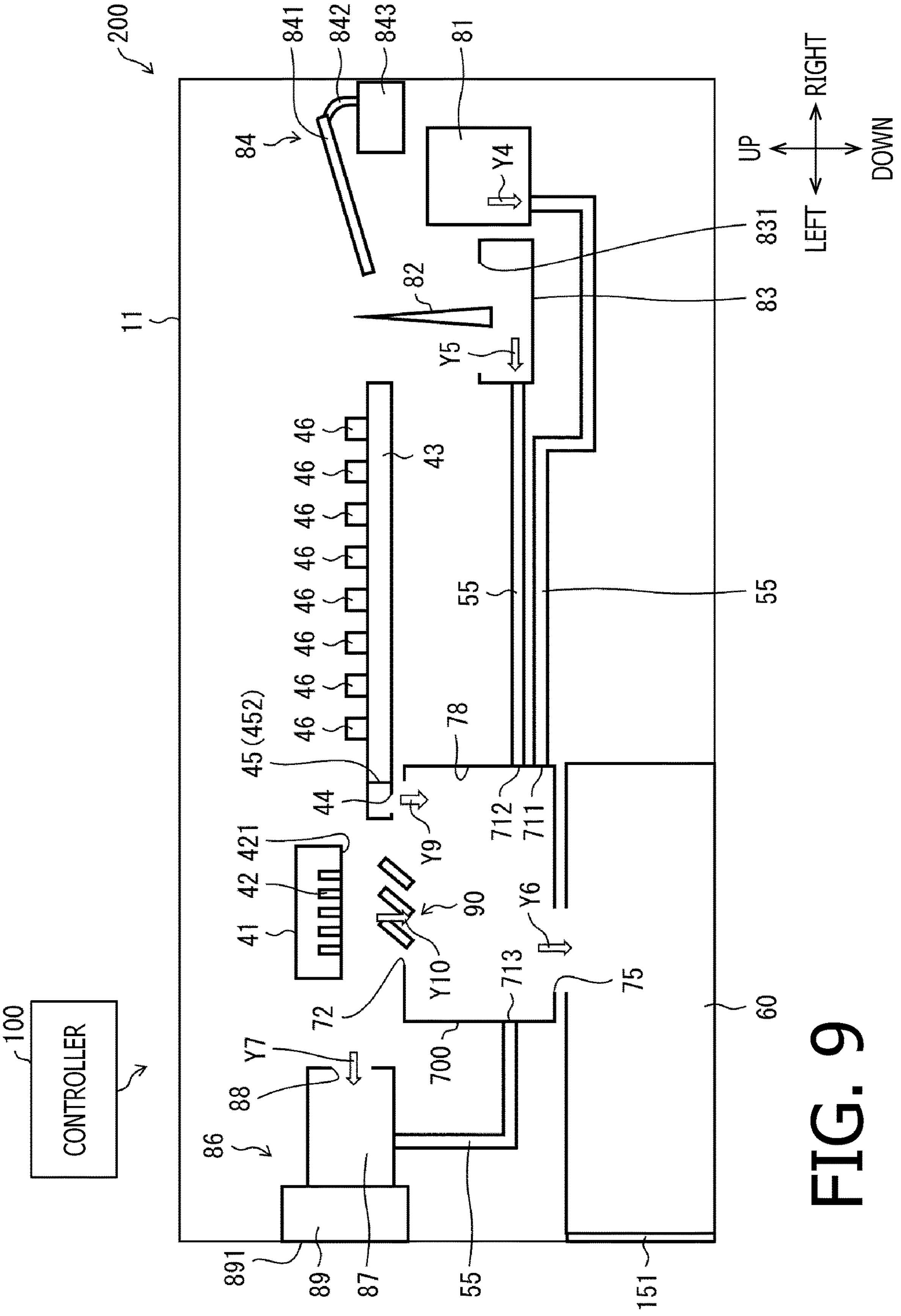
FIG. 9 is an illustrative view of an inkjet printer viewed from the front side.
Figure 10:
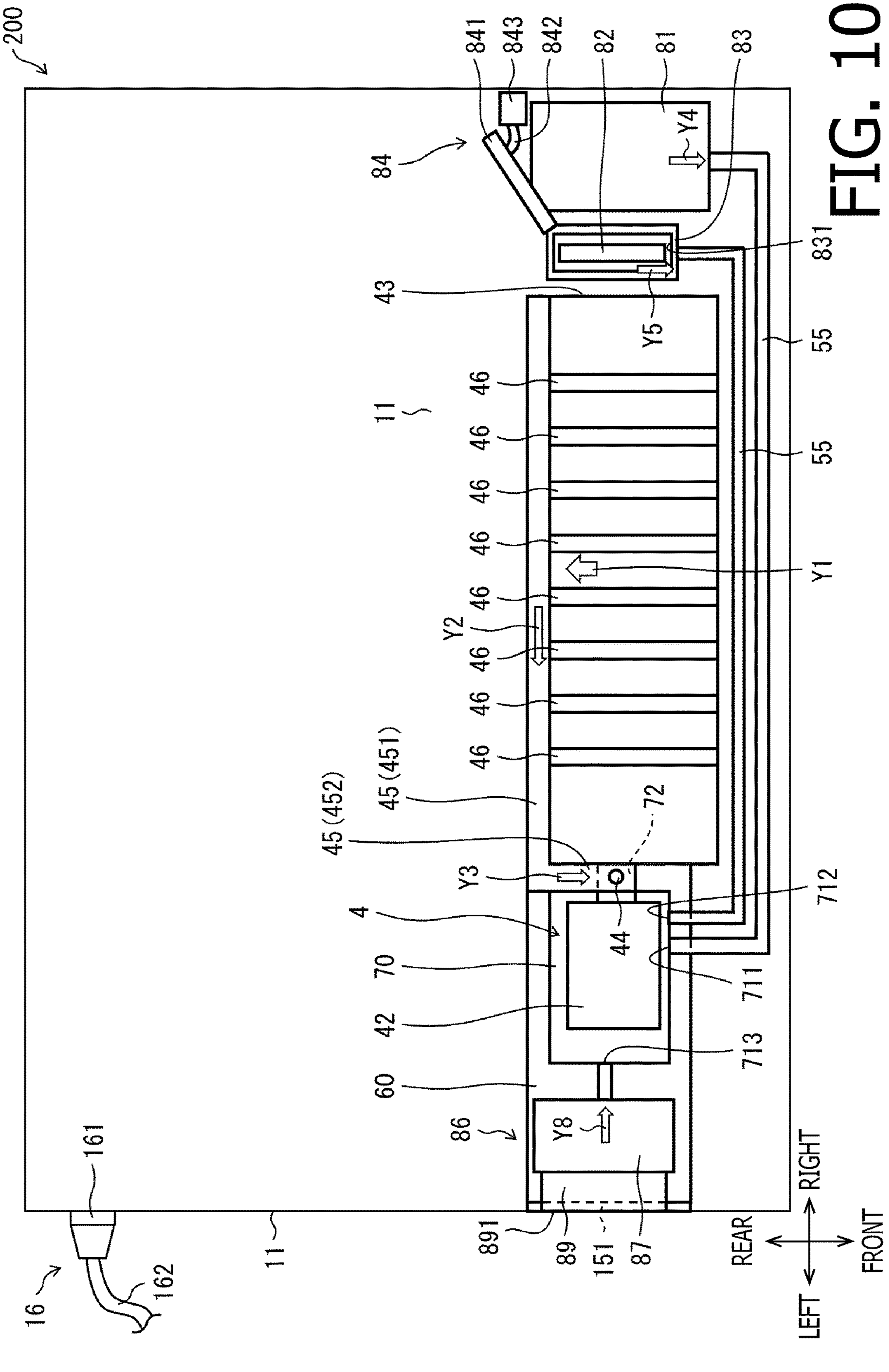
FIG. 10 is an illustrative view of the inkjet printer viewed from the upper side.
Figure 11B:
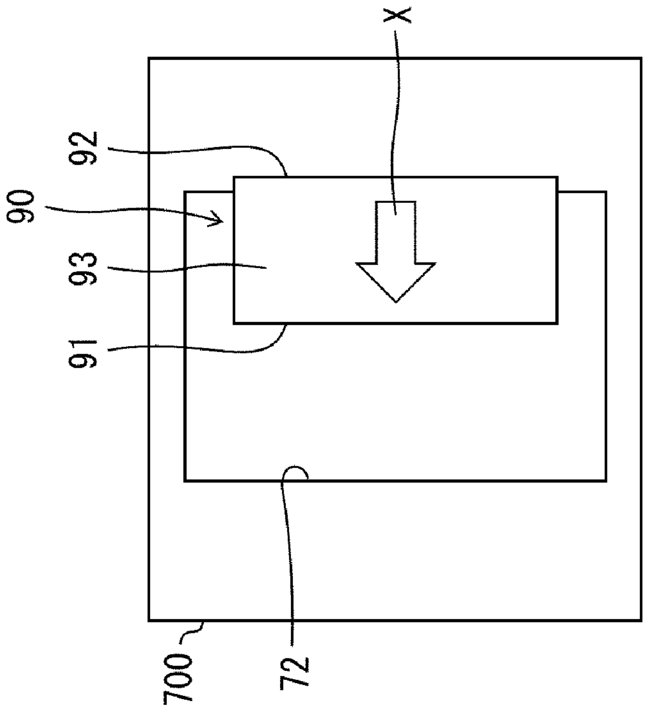
FIGS. 11A-11B are illustrative views of an intermediate box, the waste liquid box, and a waste liquid guide in the inkjet printer.
Figure 11A:
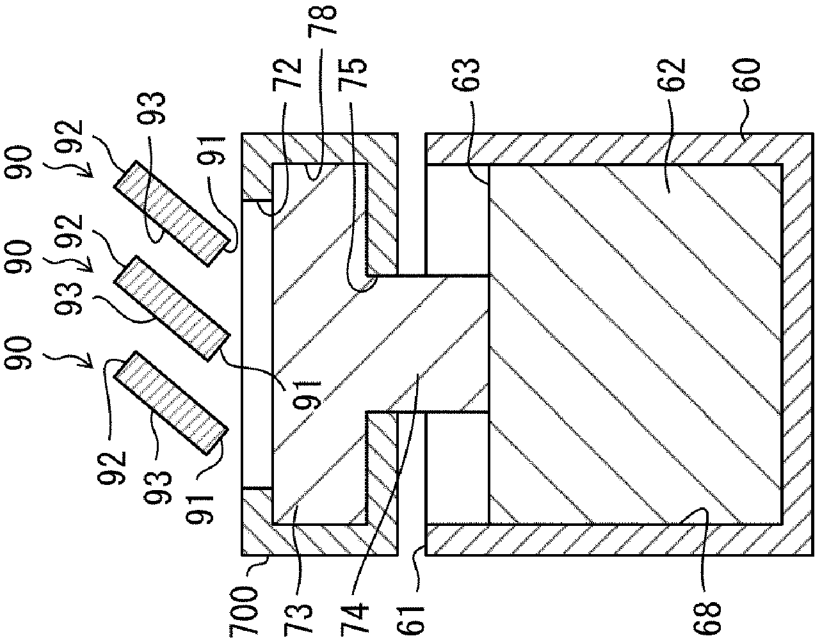

An inkjet printer 200 according to the second embodiment will be described with reference to FIGS. 9, 10, and 11A-11B. FIG. 9 is an illustrative view of the inkjet printer 200 viewed from a front side. FIG. 10 is an illustrative view of the inkjet printer 200 viewed from an upper side. FIGS. 11A-11B are illustrative views of an intermediate box 700, the waste liquid box 60, and a waste liquid guide 90 in the inkjet printer 200.

The inkjet printer 200 has the maintenance unit 81, a wiper 82, the platen 43, a duct 86, and the waste liquid guide 90 for collecting the waste liquid. The inkjet printer 200 has an intermediate box 700 with an outlet 75, through which the inks collected by the maintenance unit 81, the wiper 82, the platen 43, the duct 86, and the waste liquid guide 90 may be ejected into the waste liquid box 60.

<Configurations of Waste Liquid Collecting Devices>

Next, with reference to FIGS. 9-10, waste liquid collecting devices will be described. The arrangement of the items in the inkjet printer 200 shown in FIGS. 9-10 is merely an illustrative example and, unless otherwise noted, may not necessarily limit arrangement of the other items in the inkjet printer 200.

As shown in FIGS. 9-10, the inkjet printer 200 has the recording head 41, the platen 43, the maintenance unit 81, the wiper 82, a liquid reservoir 83, a cleaning liquid injector unit 84, the duct 86, the intermediate box 700, the waste liquid box 60, and the waste liquid guide 90.

The platen 43 may collect the inks discharged on the platen 43. The platen 43 has a slant surface, which slants in the front-rear direction to be lower toward the rear side. As shown in FIGS. 9-10, on a surface of the platen 43 toward the nozzles 42, a plurality of ribs 46 elongated in the front-rear direction are arranged. The platen 43 may support the sheet P on the plurality of ribs 46. As shown in FIG. 10, the platen 43 has a waste liquid chute 45 to collect the inks, i.e., waste liquid, flowing down along the slant surface of the platen 43. The waste liquid chute 45 may consist of, for example, gutters or grooves.

The waste liquid chute 45 is arranged in a rearend area and a leftward area in the platen 43, approximately in a form of L. In the following description, the rearward part of the waste liquid chute 45 will be called a rearward waste liquid chute 451, and the leftward part of the waste liquid chute 45 will be called a sideward waste liquid chute 452. In other words, the rearward waste liquid chute 451 and the sideward waste liquid chute 452 will be collectively called "waste liquid chute 45." The rearward waste liquid chute 451 slants to be lower toward the left. In the sideward waste liquid chute 452, a liquid outlet 44 is formed. The sideward waste liquid chute 452 slants to be lower toward the liquid outlet 44. Thus, the waste liquid chute 45 has a form, in which the collected inks may flow down toward the liquid outlet 44.

The inks discharged on the platen 43 may flow rearward on the platen 43 along the slant surface in a direction indicated by an arrow Y1. The rearward waste liquid chute 451 may receive the inks flown in the direction of the arrow Y1. The inks flowing in the rearward waste liquid chute 451 may flow in a direction indicated by an arrow Y2 to the sideward waste liquid chute 452. The inks reaching the sideward waste liquid chute 452 may flow in a direction indicated by an arrow Y3 to the liquid outlet 44.

As shown in FIG. 9, the intermediate box 700 is located at a position leftward with respect to the platen 43 and lower than the platen 43. The intermediate box 700 is located below the liquid outlet 44. As indicated by an arrow Y9 in FIG. 9, the inks flowing in the sideward waste liquid chute 452 may be drained from the platen 43 through the liquid outlet 44 and flow into the intermediate box 700. As shown in FIG. 10, the liquid outlet 44 is located at a position to overlap an opening 72 of the intermediate box 700, which will be described further below, in a view along the vertical direction. Therefore, the inks dripping down from the liquid outlet 44 may fall through the opening 72 of the intermediate box 700 and may be stored in the intermediate box 700.

The maintenance unit 81 may restore a discharging condition of the nozzles 42 in the recording head 41 to an earlier condition. As shown in FIG. 10, the maintenance unit 81 is located on an outer side of the platen 43 in the widthwise direction. The maintenance unit 81 is located on a same side of the platen 43 as a standby position of the recording head 41. The standby position of the recording head 41 is a position, at which the carriage 40 stands by when the inkjet printer 200 does not print an image on the sheet P. For example, the maintenance unit 81 may be located rightward with respect to the platen 43. The maintenance unit 81 is located at a position lower than the recording head 41 within a scanning range of the recording head 41. The maintenance unit 81 has a cap (not shown) and a suction pump (not shown).

The cap is located at a position to face the recording head 41 located at the standby position. The cap may collect the inks being waste liquid from the nozzles 42. The cap may be driven to move up and down by power of a driving motor (not shown). The cap may move upward to a position where the cap covers the nozzle surface 421 of the recording head 41 located at the standby position. The cap covering the nozzle surface 421 may seal the nozzle surface 421.

The suction pump is connected to the cap. The suction pump may be driven by the driving motor to suction the inks being the waste liquid from the nozzles 42 sealed by the cap. In other words, the suction pump may collect the inks from the nozzles 42. The driving motor may be controlled by the controller 100. The suction pump may be, for example, a tube pump. The suction pump is connected with a waste liquid tube 55. The inks suctioned from the nozzles 42 by the suction pump may flow in a direction of an arrow Y4 through the waste liquid tube 55 and may be ejected through a port 711 into the intermediate box 700.

The wiper 82 may wipe the nozzle surface 421 of the recording head 41 to remove the inks from the nozzles 42. In other words, the wiper 82 may collect the inks adhered to the nozzles 42 by wiping the nozzle surface 421. The wiper 82 may be made of rubber. The wiper 82 is located at a position in the scanning range of the recording head 41. The wiper 82 is located to be lower than the recording head 41. The wiper 82 is located between the platen 43 and the maintenance unit 81 in the widthwise direction.

An upper end of the wiper 82 may contact the nozzle surface 421 of the recording head 41. The wiper 82 is supported by a holder (not shown) and may move in the vertical direction. When the inkjet printer 200 records an image, the wiper 82 moves downward to a position where the wiper 82 may not contact the nozzle surface 421. After the maintenance unit 81 suctions the ink from the nozzles 42, the wiper 82 may move upward to a position where the wiper 82 contacts the nozzle surface 421. The wiper 82 moved to the upper position may contact the nozzle surface 421 of the recording head 41 that runs on the wiper 82. Thereby, the wiper 82 may wipe the nozzle surface 421 and remove the inks being the waste liquid adhered to the nozzles 42. The inks removed from the nozzles 42 by the wiper 82 may flow on the wiper 82 into the liquid reservoir 83.

The cleaning liquid injector unit 84 is located in the vicinity of the wiper 82. The cleaning liquid injector unit 84 is located on the same side of the platen 43 as the wiper 82 in the scanning direction of the recording head 41. The cleaning liquid injector unit 84 includes a cleaning liquid injector nozzle 841, a cleaning liquid supplying tube 842, and a cleaning liquid reservoir 843.

The cleaning liquid injector nozzle 841 may inject cleaning liquid for cleaning at the wiper 82. The cleaning liquid injector nozzle 841 is located at a position where the cleaning liquid from the cleaning liquid injector nozzle 841 may reach the wiper 82. The cleaning liquid is stored in the cleaning liquid reservoir 843. When the controller 100 operates a cleaning liquid supplying unit (not shown), which includes a pump, the cleaning liquid supplying unit may supply the cleaning liquid stored in the cleaning liquid reservoir 843 to the cleaning liquid injector nozzle 841 through the cleaning liquid supplying tube 842. The cleaning liquid injector nozzle 841 may inject the cleaning liquid supplied from the cleaning liquid reservoir 843 at the wiper 82. The cleaning liquid injected from the cleaning liquid injector nozzle 841 may be stored in the liquid reservoir 83 as waste liquid.

As shown in FIG. 9, the liquid reservoir 83 is located below the wiper 82. The liquid reservoir 83 may store the ink removed by the wiper 82 from the nozzle surface 421 and the cleaning liquid injected from the cleaning liquid injector nozzle 841. In other words, the liquid reservoir 83 may collect the cleaning liquid injected from the cleaning liquid injector nozzle 841.

The liquid reservoir 83 is a casing having an opening 831 on an upper side thereof. The ink removed by the wiper 82 and the cleaning liquid injected from the cleaning liquid injector nozzle 841 may fall through the opening 831 to be stored in the liquid reservoir 83. The liquid reservoir 83 is connected with the intermediate box 700 through a waste liquid tube 55. The inks and the cleaning liquid collected in the liquid reservoir 83 may flow into the waste liquid tube 55, as indicated by an arrow Y5 shown in FIGS. 9 and 10. Further, the inks and the cleaning liquid may be ejected through the waste liquid tube 55 and a port 712 into the intermediate box 700.

The duct 86 may suction mist of liquid produced in the main housing 11. In particular, the duct 86 may suction mist of the inks discharged from the nozzles 42 of the recording head 41 and/or mist of the cleaning liquid injected from the cleaning liquid injector nozzle 841. The duct 86 is located on a leftward side in the main housing 11. The duct 86 includes a fan 89 and a conduit 87.

The fan 89 may expel the air inside the main housing 11 to the outside of the main housing 11 through an air outlet 891. The fan 89 may be driven by the controller 100. The fan 89 is connected with the conduit 87 being a passage for the air. The conduit 87 is a passage, through which the air suctioned from the inside of the main housing 11 may be transported to the air outlet 891. One end of the conduit 87 is connected to the fan 89 and to the air outlet 891, and the other end of the conduit 87 is connected to an air inlet 88, through which the air inside the main housing 11 may be drawn into the conduit 87.

When the fan 89 is driven, the air pressure inside the main housing 11 may be lowered, and the air in the main housing 11 may be suctioned through the air inlet 88. The liquid in the form of mist discharged from the nozzles 42 of the recording head 41 may be suctioned together with the air inside the main housing 11 through the air inlet 88, as indicated by an arrow Y7 shown in FIG. 9. The liquid in the form of mist may be condensed in the conduit 87 into liquid and accumulate as waste liquid. To the conduit 87, a waste liquid tube 55 is connected. The waste liquid accumulated in the conduit 87 may be ejected through the waste liquid tube 55 and a port 713 into the intermediate box 700, as indicated by an arrow Y8 in FIG. 10.

The controller 100 may execute the flushing process, in which the controller 100 operates the recording head 41 to discharge the inks from the nozzles 42 at the opening 72 of the intermediate box 700. For executing the flushing process, the controller 100 may move the recording head 41 to a flushing area, where the flushing process is performed.

In FIGS. 9 and 10, the recording head 41 located in the flushing area is illustrated. The flushing process is performed in the flushing area, which is on an opposite side to the standby position of the recording head 41 across the platen 43. In the present embodiment, the flushing process is executed on a leftward side to the platen 43 in the widthwise direction. The flushing area is an area above the opening 72 of the intermediate box 700. As indicated by an arrow Y10 shown in FIG. 9, the inks discharged from the nozzles 42 during the flushing process, i.e., waste liquid, may fall through the opening 72 to be stored in the intermediate box 700.

As shown in FIG. 9, in a direction of height of the inkjet printer 200, i.e., in the vertical direction, at a position above the intermediate box 700, the waste liquid guide 90 is arranged. The waste liquid guide 90 may receive the inks discharged from the recording head 41 in the flushing process. The waste liquid guide 90 is a piece that may guide the inks discharged from the nozzles 42 in the flushing process to the opening 72 of the intermediate box 700. The waste liquid guide 90 is, in the direction of height of the inkjet printer 200, located to be lower than the recording head 41. The waste liquid guide 90 is located between the nozzles 42 of the recording head 41 located in the flushing area and the opening 72 of the intermediate box 700. The waste liquid guide 90 is retained by a retainer, which is not shown. A number of piece(s) of the waste liquid guide 90 may not necessarily be limited as long as at least one piece of waste liquid guide 90 is provided.

The waste liquid guide 90 and the intermediate box 700 will be described below with reference to FIGS. 11A-11B. FIG. 11A illustrates a cross-sectional view of the intermediate box 700, the waste liquid box 60, and the waste liquid guide 90. FIG. 11B illustrates a top plan view of the intermediate box 700 and the waste liquid guide 90. In FIG. 11A, illustration of the ports 711, 712, 713 in the intermediate box 700 is omitted for a viewer's easier understanding.

As shown in FIG. 11A, an end 92 of the waste liquid guide 90 toward the recording head 41 and an end 91 of the waste liquid guide 90 toward the intermediate box 700 are located to be higher than the opening 72. Optionally, however, the waste liquid guide 90 may be arranged to partly overlap the opening 72 in the vertical direction. A surface of the waste liquid guide 90 on a side toward the nozzles 42 is a slant surface 93, which slants with respect to the opening 72.

FIG. 11B illustrates a positional relation between the waste liquid guide 90 and the opening 72 of the intermediate box 700. In the top plan view in FIG. 11B, for a viewer's easier understanding, a single piece of waste liquid guide 90 alone is illustrated while the other pieces of waste liquid guide 90 are omitted. In the top plan view to look down the main housing 11 from an upper side, the end 91 of the waste liquid guide 90 toward the intermediate box 700 is located to overlap the opening 72.

The inks discharged in the flushing process may land on the slant surface 93 of the waste liquid guide 90. As indicted by an arrow X in FIG. 11B, the inks landing on the slant surface 93 may flow down on the slant surface 93 and drip down from the end 91 of the waste liquid guide 90 to the intermediate box 700 through the opening 72.

<Configuration of Intermediate Box 700>

The intermediate box 700 is a tank to store the inks drained from a plurality of waste liquid collecting devices. The intermediate box 700 intervenes in flows of the inks between the waste liquid collecting devices and the waste liquid box 60. In other words, the intermediate box 700 relays the inks to flow from the waste liquid collecting devices to the waste liquid box 60. The intermediate box 700 has the ports 711, 712, 713, the opening 72, a first waste liquid absorber 73, the outlet 75, and a first waste liquid reservoir 78.

The ports 711, 712, 713 are parts of the intermediate box 700, to which the waste liquid tubes 55 are connected. The opening 72 is formed on the upper face of the intermediate box 700. The opening 72 of the intermediate box 700 is formed at a position coincident with the liquid outlet 44 in the platen 43 in the vertical direction. The opening 72 of the intermediate box 700 may accept the inks ejected from the liquid outlet 44 in the platen 43. A size of the opening 72 of the intermediate box 700 is larger than a size of the liquid outlet 44 in the platen 43. The opening 72 of the intermediate box 700 is formed at a position to coincide with the nozzles 42 of the recording head 41 in the vertical direction, and the opening 72 may accept the inks discharged from the nozzles 42. The size of the opening 72 is larger than a size of the nozzle surface 421.

The liquid received through the ports 711, 712, 713 and the opening 72 may be stored in the first waste liquid reservoir 78. In other words, the first waste liquid reservoir 78 may store the ink and the cleaning liquid drained from the platen 43, the maintenance unit 81, the liquid reservoir 83, and the duct 86. Moreover, the first waste liquid reservoir 78 may store the ink discharged in the flushing process.

As shown in FIGS. 11A-11B, the intermediate box 700 has the first waste liquid absorber 73 inside the first waste liquid reservoir 78. The first waste liquid absorber 73 may absorb the liquid received in the first waste liquid reservoir 78. The first waste liquid absorber 73 may be made of, for example, unwoven fabric, sponge, or cotton that may absorb the liquid. The first waste liquid absorber 73 has a protrusion 74 protruding toward the waste liquid box 60. In particular, the protrusion 74 protrudes outward from the intermediate box 700 through the outlet 75 formed in the intermediate box 700. In other words, the protrusion 74 is exposed outside the intermediate box 700 through the outlet 75. Through the protrusion 74, the liquid collected in the first waste liquid reservoir 78 may be drained outside the intermediate box 700.

<Configuration of Waste Liquid Box 60>

The waste liquid box 60 is mountable in and demountable from the main housing 11 through the opening of the mountable compartment 152, which may be exposed when the cover 151 is open. The liquid drained from the intermediate box 700 may flow into the waste liquid box 60 as indicated by an arrow Y6 in FIG. 9. As shown in FIG. 11A, the waste liquid box 60 has an opening 61, a second waste liquid absorber 62, and a second waste liquid reservoir 68. The opening 61 is formed at a position to coincide with the protrusion 74 of the intermediate box 700.

The liquid in the intermediate box 700 may be passed to the second waste liquid reservoir 68 in the waste liquid box 60 through the protrusion 74. In other words, the second waste liquid reservoir 68 may store the liquid passed from the waste liquid collecting devices. The waste liquid box 60 has a second waste liquid absorber 62 inside. The second waste liquid absorber 62 may absorb the liquid passed from the protrusion 74 of the intermediate box 700. The second waste liquid absorber 62 may be made of, for example, unwoven fabric, sponge, or cotton that may absorb the liquid.

As shown FIG. 11A, the second waste liquid absorber 62 is in contact with the protrusion 74 of the intermediate box 700. The second waste liquid absorber 62 has a contact surface 63, on which the protrusion 74 abuts. With the second waste liquid absorber 62 having the contact surface 63, the liquid absorbed in the first waste liquid absorber 73 in the intermediate box 700 may be passed from the protrusion 74 to the second waste liquid absorber 62. Therefore, the liquid drained from the protrusion 74 may be stored in the second waste liquid reservoir 68.

According to the embodiment described above, the inkjet printer 200 may once collect the waste liquid produced in the inkjet printer 200 in the intermediate box 700 and thereafter store the waste liquid in the waste liquid box 60.

While the invention has been described in conjunction with example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A liquid discharging apparatus, comprising:

a main housing;

a liquid discharging head having nozzles for discharging liquid;

a container configured to store a plurality of sheets of printable medium inside the main housing;

a waste liquid storage located at a position to at least partly overlap the container and lower than the container in a vertical direction, the vertical direction intersecting orthogonally with a nozzle surface of the liquid discharging head, the waste liquid storage being configured to store the liquid discharged from the liquid discharging head; and a mountable compartment, in which the waste liquid storage is demountably mountable, the mountable compartment being formed on a sideward face of the main housing on one side in a widthwise direction, the widthwise direction being a scanning direction of the liquid discharging head, the mountable compartment being open at a position frontward with respect to a connector, the connector connecting a power cord for receiving external power supply to the main housing there-through, in a front-rear direction being a conveying direction to convey the printable medium and toward which the printable medium is ejected from the main housing.

2. The liquid discharging apparatus according to claim 1, further comprising a liquid tank configured to store the liquid to be supplied to the liquid discharging head, wherein the liquid tank is located alongside the container and the waste liquid storage in the widthwise direction in the main housing.

3. The liquid discharging apparatus according to claim 1, further comprising a liquid tank configured to store the liquid to be supplied to the liquid discharging head, wherein the mountable compartment is located on the sideward face on a side in the widthwise direction opposite to the liquid tank across a conveyer path for the printable medium.

4. The liquid discharging apparatus according to claim 1, further comprising a liquid tank configured to store the liquid to be supplied to the liquid discharging head, wherein the waste liquid storage is located at least partly rearward in the front-rear direction with respect to a position to locate the liquid tank in the main housing.

5. The liquid discharging apparatus according to claim 1, wherein the mountable compartment is located on the sideward face between a first position, the first position being apart by a predetermined distance from a position where a rearward face of the main housing being on a rear side in the front-rear direction and the sideward face of the main housing meet, and a second position, the second position being apart by a predetermined distance from a position where a frontward face of the main housing being on a front side in the front-rear direction and the sideward face of the main housing meet.

6. The liquid discharging apparatus according to claim 1, wherein a dimension of the waste liquid storage in the widthwise direction is greater than a dimension of the container in the widthwise direction.

7. The liquid discharging apparatus according to claim 1, wherein the waste liquid storage is mounted in the mountable compartment in a posture, in which an edge of a frontward face of the waste liquid storage being on a front side in the front-rear direction toward an opening of the mountable compartment is located frontward with respect to an edge of the frontward face opposite to the opening of the mountable compartment.

8. The liquid discharging apparatus according to claim 1, wherein the mountable compartment is open at a position frontward with respect to a gripper for a user to grab the main housing.

9. The liquid discharging apparatus according to claim 1, further comprising a waste liquid collecting device configured to collect the liquid discharged from the liquid discharging head.

10. The liquid discharging apparatus according to claim 9, wherein the waste liquid collecting device is a duct configured to suction mist of the liquid produced inside the main housing.

11. The liquid discharging apparatus according to claim 9, wherein the waste liquid collecting device is a platen configured to support the printable medium being conveyed.

12. The liquid discharging apparatus according to claim 9, wherein the waste liquid collecting device is a cap configured to seal the nozzles of the liquid discharging head by covering the nozzle surface.

13. The liquid discharging apparatus according to claim 9, wherein the waste liquid collecting device is a wiper configured to remove the liquid from the nozzles.

14. The liquid discharging apparatus according to claim 9, wherein the waste liquid collecting device is a receiver configured to receive the liquid discharged from the liquid discharging head in a flushing process.

15. The liquid discharging apparatus according to claim 9, further comprising an intermediate box having an outlet for ejecting the liquid collected by the waste liquid collecting device into the waste liquid storage.

* * * * *